April 17, 1945.  J. BRYANT  2,373,809
BABY CARRIAGE
Filed July 11, 1944  3 Sheets-Sheet 2
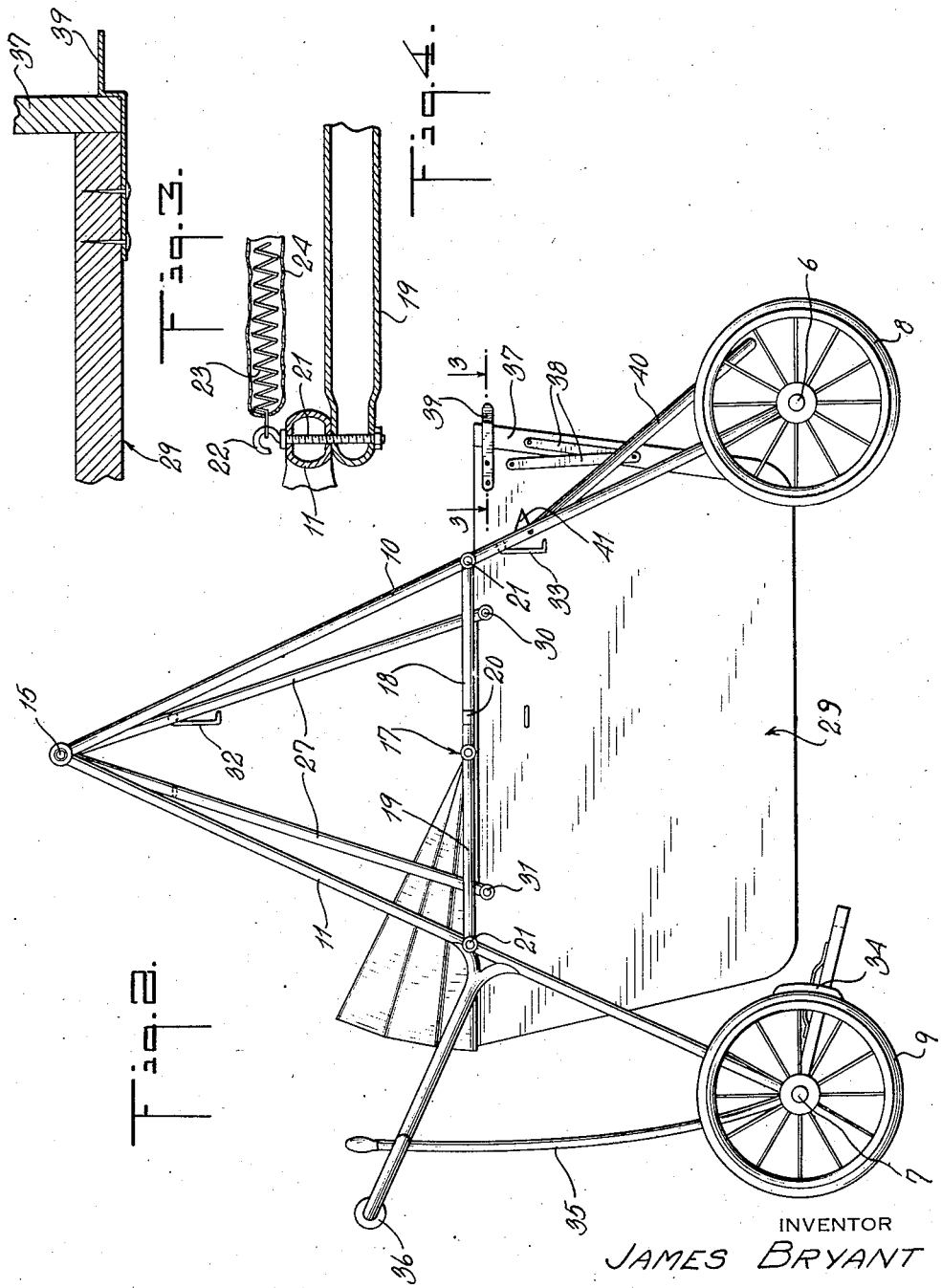
INVENTOR
JAMES BRYANT
BY
Jones & Roe
ATTORNEYS

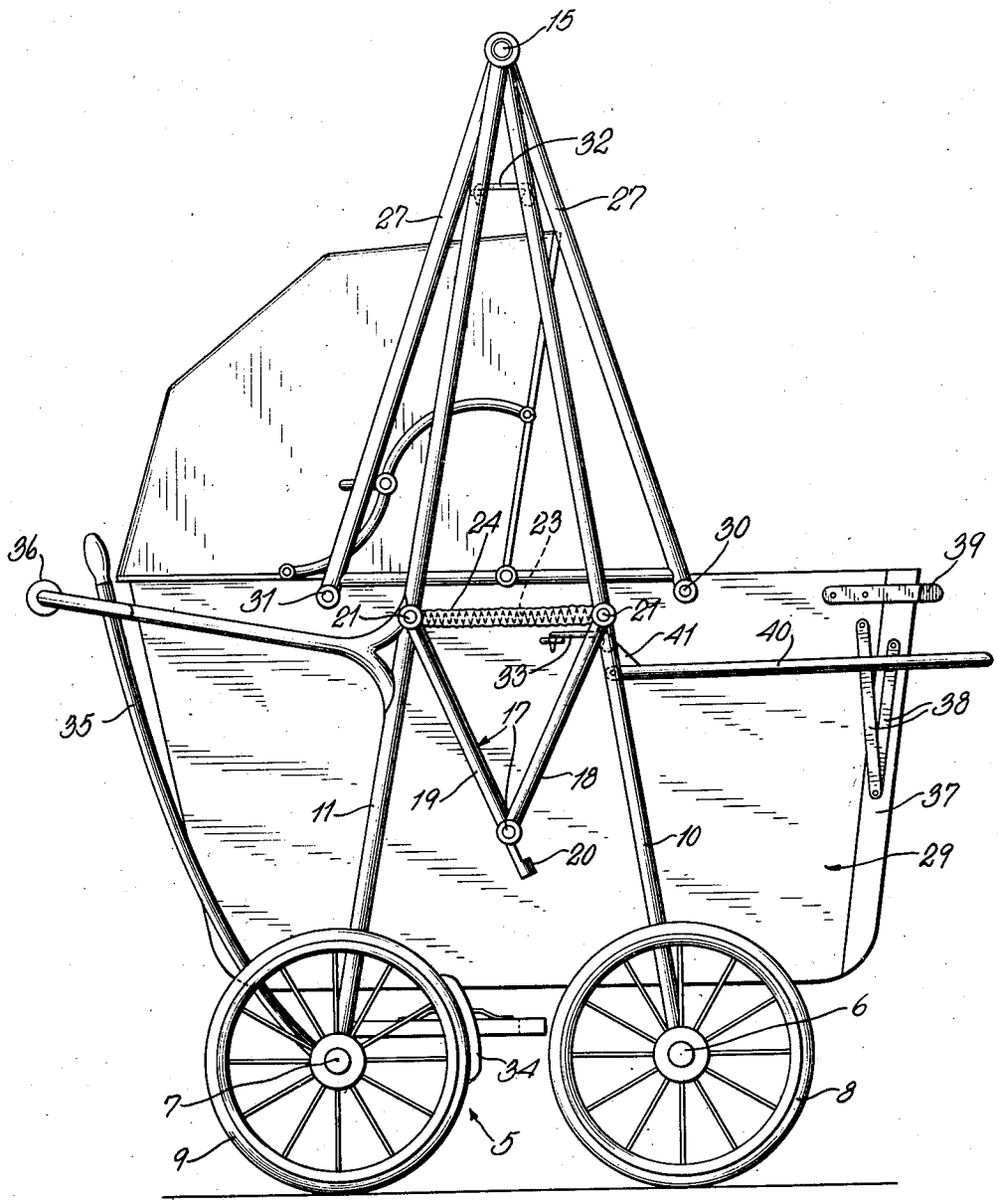

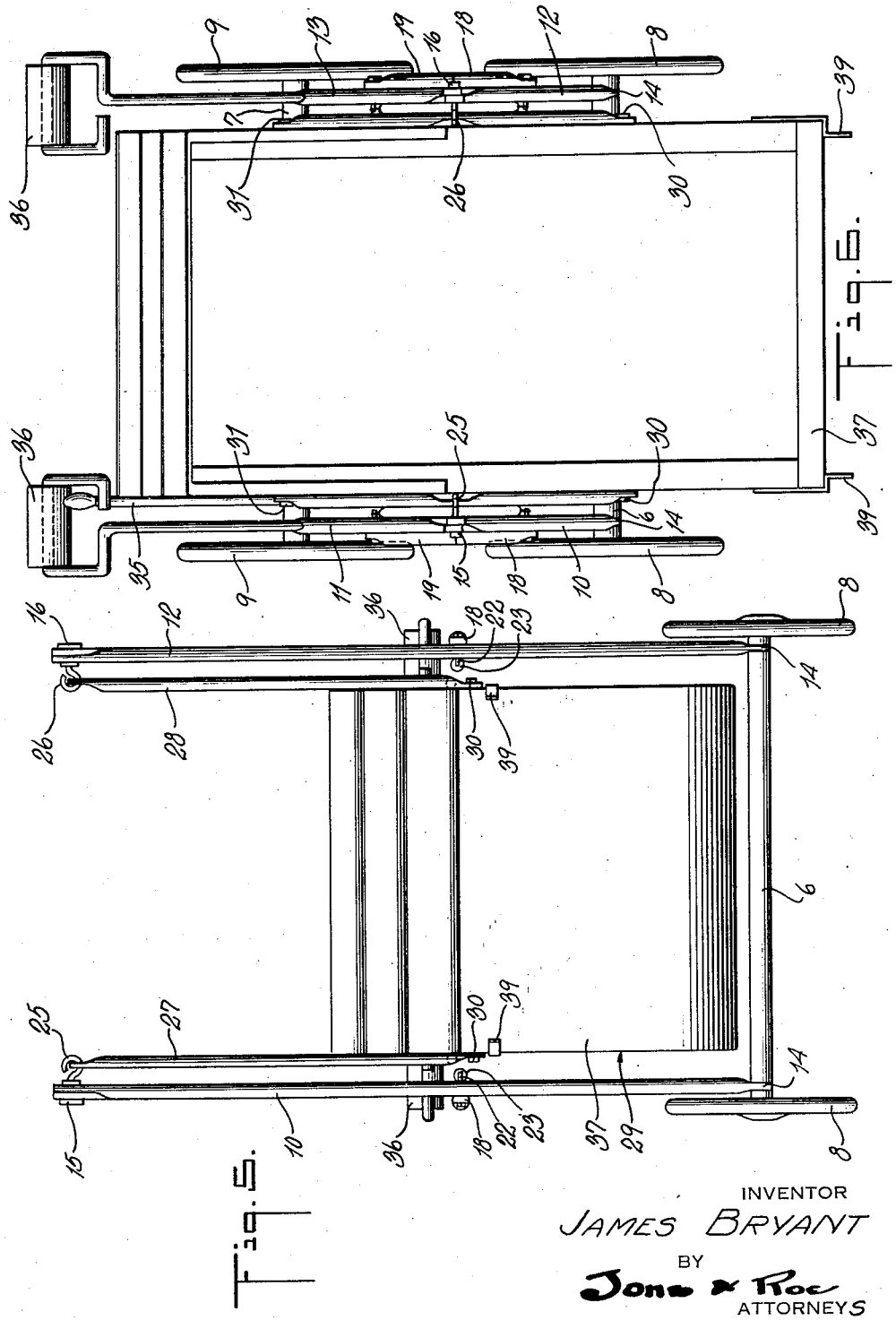

Patented Apr. 17, 1945

2,373,809

UNITED STATES PATENT OFFICE 2,373,809

BABY CARRIAGE

James Bryant, New York, N. Y., assignor of one-half to George Carter and Mamie Carter, New York, N. Y.

Application July 11, 1944, Serial No. 544,365

7 Claims. (Cl. 280—31)

My invention relates to improvements in baby carriages.

Primarily, the object sought is the provision of a carriage of this type, which may be wheeled in the conventional manner, but which is constructed to permit of it also being transposed to a swing; i. e., the chassis may be brought to a standstill, a brake applied to the wheels, then by quick manipulation, the chassis, including the wheels, extended to afford a more desirable foothold, so as to speak, with reference to the surface upon which it rests, whereupon the body supports are freed from the chassis uprights and the body may swing longitudinally of the chassis with maximum safety. Or, if preferred, the extension of the chassis may be dispensed with, and the carriage body swung while the chassis is in normal position.

Other objects are to arrange certain mechanism which actuates the uprights out of the reach of the baby; and to provide an extension at the foot of the body so that the body may, if desired, be used as a bed.

To the accomplishment of the recited objects and others subordinate therewith, one embodiment of my invention resides in the construction and arrangement of parts hereinafter described, illustrated in the accompanying drawings and embodied in the scope of the appended claims.

In said drawings:

Fig. 1 is a side elevation of the carriage set up for wheeling.

Fig. 2 is a similar view illustrating the distended position of the chassis as the swing is brought into play, Fig. 3 is an enlarged transverse section, along lines 3—3 of Fig. 2, showing the manner of releasably holding the foot-board of the body, Fig. 4 is a view, in enlarged detail, of the link hinge connection and spring, Fig. 5 is a front elevation of the carriage exhibited in Fig. 2 and Fig. 6 is a top plan view of the carriage.

With more particular reference to the drawings, 5 designates generally what may be termed the chassis, including front and rear axles 6—7, wheels 8—9, and two pairs of uprights 10—11 and 12—13.

The lower ends of each pair of uprights are pivoted to the axle extremities, as at 14—see Fig. 5—and converge towards their upper ends, where they are hinged at 15—16. About midway of the vertical extent of each pair of uprights is a link hinge 17, with two normally depending links 18—19, link 19 having a short projecting portion 20 which serves to overlap the adjacent link 18 when the uprights are spread apart to limit further movement of the links, as will be seen in Fig. 2. The upper terminals of the links may be conveniently pivoted to the uprights by a screwbolt 21 provided at its inner end with a hook-eye 22 to receive the looped extremity of a coil spring 23, preferably equipped with a cover 24 of leather or the like—as will be noted in Fig. 3.

Suspended from hook-eyes 25—26 at the upper ends of uprights 10—11 and 12—13, are inverted V shaped frames 27—28. Their lower ends are fixed to the upper edges of the carriage body 29, as at 30 and 31.

To lock the uprights in the contracted relationship illustrated in Fig. 1, latches 32 are employed. Concerning the uprights and the body, these are held together by similar fasteners 33.

The carriage is also equipped with a brake 34 which may be applied to the rear wheels 9 through the medium of lever 35 engageable and disengageable with the handle 36. Moreover, the foot 37 may be provided with link hinges 38 and spring clips 39, whereby it can be opened forwardly to present an extension for use under varying circumstances. Still further, a bail-like handle 40 limited in its upward movement by stops 41, aids one in lifting the carriage over curbs and the like.

The normal position of the carriage, as depicted in Fig. 1, shows the uprights 10—11 and 12—13 and the axles 6 and 7 in contracted relationship, the latches 32—33 secured, and the link hinges 17 broken and disposed to the sides of the body 29 below the upper edge thereof and well out of reach of the baby—in short, the carriage is in readiness for wheeling with said body rigidly connected to the chassis. To convert the body to a swing, it is simply necessary to apply brakes 34, unfasten the latches, and constrain the links 18—19 upwardly until they are in a straight line and parallel with the upper edge of the body. Simultaneously, the axles 6—7 are impelled forwardly and rearwardly until they assume the positions shown in Fig. 2. This stance is preferable, because with the wheels fully spread apart there is less likelihood of the carriage tipping over, and then too, a greater freedom of swing is permitted, although if one desires, the swing feature may be utilized when the chassis is contracted.

In its broader aspects the invention comprehends the employment not only of the means described, but of equivalent means for performing the recited functions. It is desired to reserve the right to effect such changes as may come fairly within the scope of the appended claims.

I claim:

1. A baby carriage comprising a chassis including a pair of axles, front and rear wheels, braking mechanism for the rear wheels, contractible and expansible uprights extending from the axles, handles carried by the uprights, frames connected to the uprights, and a body mounted at the base of the frames, said body adapted for swinging movement between the uprights and said handles.

2. A baby carriage comprising a chassis including contractible and expansible uprights, frames swingably connected to said uprights, a body mounted at the base of the frames, means for locking the uprights in their contracted relationship and the body with respect to the uprights, and lock-releasing means designed to permit an expansion of the uprights and a swinging of the body.

3. A baby carriage comprising a chassis, including contractible and expansible uprights, and wheel-braking mechanism, frames swingably connected to said uprights, a body mounted at the base of the frames, means for locking the uprights in their contracted relationship and the body with respect to the uprights, and lock-releasing means designed to permit an expansion of the uprights and a swinging of the body.

4. A baby carriage comprising a chassis including contractible and expansible uprights, frames swingably connected to said uprights, a body mounted at the base of the frames, a spring actuated link hinge between the uprights and located on the outsides of the body for locking the uprights in their contracted relationship and the body with respect to the uprights, and lock-releasing means designed to permit an expansion of the uprights and a swinging of the body.

5. A baby carriage comprising a chassis including two pairs of contractible and expandable uprights, a pair of frames swingable longitudinally and connected adjacent the upper ends of said uprights, a body mounted at the base of the frames, means for locking the uprights in their contracted relationship and the body with respect to the uprights, and means for releasing the locking mechanism to permit an expansion of the uprights and a swinging of the body.

6. A baby carriage comprising a chassis, including a pair of axles, wheels mounted on the axles, two pairs of uprights, each pair of uprights pivotally mounted at opposite extremities of the axles and also pivotally connected at their upper terminals, a laterally extending support carried by the upper pivot points of the uprights, a pair of frames swingably suspended by said supports, a body mounted at the base of the frames, locking mechanism for rigidly sustaining the frames with respect to the uprights, and means for releasing said mechanism to permit the body to be swung longitudinally.

7. A baby carriage comprising a chassis including a pair of axles, wheels mounted on the axles, two pairs of uprights, each pair of uprights pivotally mounted at opposite extremities of the axles and also pivotally connected at their upper terminals, a spring actuated link hinge positioned between each pair of uprights, a laterally extending support carried by the upper pivot points of the uprights, a pair of frames swingably suspended by said supports, a body mounted at the base of the frames, locking mechanism for rigidly sustaining the frames with respect to the uprights, and means for releasing said mechanism to permit the body to be swung longiudinally.

JAMES BRYANT.